United States Patent
El-Shoubary et al.

(10) Patent No.: US 11,891,525 B2
(45) Date of Patent: Feb. 6, 2024

(54) PIGMENT WITH ENHANCED DURABILITY AND PLASTIC MATERIALS MADE THEREWITH

(71) Applicant: INEOS Pigments USA Inc., Glen Burnie, MD (US)

(72) Inventors: Modasser El-Shoubary, Crofton, MD (US); Lee Chris Mundle, White Hall, MD (US); Mark B. Watson, Kensington, MD (US)

(73) Assignee: Ineos Pigments USA Inc., Glen Burnie, MD (US)

( * ) Notice: Subject to any disclaimer, the term of this patent is extended or adjusted under 35 U.S.C. 154(b) by 260 days.

(21) Appl. No.: 17/071,314

(22) Filed: Oct. 15, 2020

(65) Prior Publication Data

US 2021/0130620 A1    May 6, 2021

Related U.S. Application Data

(60) Provisional application No. 62/923,052, filed on Oct. 18, 2019.

(51) Int. Cl.
*C09C 3/06* (2006.01)
*C08K 3/013* (2018.01)
(Continued)

(52) U.S. Cl.
CPC .............. *C09C 3/063* (2013.01); *C08K 3/013* (2018.01); *C08K 3/22* (2013.01); *C08K 5/092* (2013.01);
(Continued)

(58) Field of Classification Search
None
See application file for complete search history.

(56) References Cited

U.S. PATENT DOCUMENTS

| 2,559,638 A | 7/1951 | Krehma et al. |
| RE27,818 E | 11/1973 | Werner |

(Continued)

FOREIGN PATENT DOCUMENTS

| CN | 104194409 | 12/2014 |
| CN | 107254198 | 10/2017 |

OTHER PUBLICATIONS

Gao, et al., "Cerium Oxide Coating of Titanium Dioxide Pigment to Decrease its Photocatalytic Activity," *Industrial & Engineering Chemistry Research* 2013, pp. 189-197, vol. 53, No. 1.

(Continued)

*Primary Examiner* — James A Fiorito
*Assistant Examiner* — Ross J Christie
(74) *Attorney, Agent, or Firm* — Womble Bond Dickinson (US) LLP

(57) ABSTRACT

The invention provides a method for enhancing the durability of a titanium dioxide material, the method including mixing citric acid and an alumina source with an aqueous slurry of titanium dioxide particles and water to form a mixture, the mixture having an acidic pH; and raising the pH of the mixture to a pH of no more than about 7.5 to form alumina-coated titanium dioxide particles. The invention also provides a pigmented plastic article including alumina-coated titanium dioxide particles prepared according to the invention dispersed in a polymer material.

17 Claims, 3 Drawing Sheets

(51) Int. Cl.
*C08K 3/22* (2006.01)
*C08K 5/092* (2006.01)
*C08K 9/02* (2006.01)

(52) U.S. Cl.
CPC ........ *C08K 9/02* (2013.01); *C08K 2003/2227* (2013.01); *C08K 2003/2241* (2013.01)

(56) References Cited

U.S. PATENT DOCUMENTS

| | | | |
|---|---|---|---|
| 4,737,194 A * | 4/1988 | Jacobson | C09C 3/08 106/439 |
| 5,824,145 A * | 10/1998 | Marganski | C09D 17/008 106/443 |
| 5,993,533 A * | 11/1999 | Diebold | C09C 1/3653 106/446 |
| 6,342,099 B1 | 1/2002 | Hiew et al. | |
| 6,646,037 B1 * | 11/2003 | El-Shoubary | C09C 1/3661 106/500 |
| 7,276,231 B2 | 10/2007 | Frerichs et al. | |
| 7,309,482 B2 * | 12/2007 | Buseman-Williams | A61Q 17/04 424/59 |
| 2018/0298197 A1 | 10/2018 | Jones et al. | |

OTHER PUBLICATIONS

Imali et al., "Citric Acid Adsorption on TiO2 Nanoparticles in Aqueous Suspensions at Acidic and Circumneutral pH: Surface Coverage, Suface Speciation, and its Impact on Nanoparticle-Nanoparticle Interactions," *Journal of the American Chemical Society*, 2010, pp. 14986-14994, v. 132, No. 42.

John et al., "Preparation of Multi-Purpose TiO2 Pigment with Improved Properties for Coating Applications," *Powder Technology*, 2020, pp. 269-273, vol. 377.

* cited by examiner

PIGMENT WITH ENHANCED DURABILITY AND PLASTIC MATERIALS MADE THEREWITH

FIELD OF THE INVENTION

The present disclosure relates to coated titanium dioxide ($TiO_2$) particles. The invention further relates to methods of making and using such particles, such as for pigmenting plastic materials.

BACKGROUND

Titanium dioxide ($TiO_2$), an excellent UV light absorbing pigment, has long been used in the plastics industry to enhance the durability of the plastic. Degradation of polymers making up the plastic occurs by direct absorption of UV light is reduced or eliminated by incorporating titanium dioxide into the polymers.

Another form of degradation associated with light absorption is photocatalytic degradation. After exposure to UV light, a small number of excited $TiO_2$ particles may have its energy transported to the pigment surface where it can interact with water and oxygen on the $TiO_2$ surface. This interaction results in the formation of hydroxyl and superoxide radicals. In turn, the superoxide radicals can react with an organic binder, thereby degrading the binder.

A common solution to photocatalytic degradation in the paints and coatings industry is to provide a surface treatment of the $TiO_2$ particle with an inert oxide (usually by encapsulation with $SiO_2$ and/or $Al_2O_3$) which prevents the photocatalytic cascade from even starting (i.e., no interaction between the excited $TiO_2$ particles and water/oxygen). However, coating the $TiO_2$ particles with an inert oxide compromises the ability of the titanium dioxide to prevent direct degradation of plastics.

There still exists a need in the art for a titanium dioxide material with enhanced durability for use as a pigment in plastic products.

SUMMARY OF THE INVENTION

The present disclosure provides a method for enhancing the durability of a titanium dioxide material. The method of the disclosure provides alumina-coated titanium dioxide particles that are suitable for use in a variety of products as a pigment material, particularly those products designated as semi-durable plastic materials. The method of the disclosure provides a material that combines strong durability with good handling characteristics, and at surprisingly low alumina inclusion levels.

In one aspect, the present disclosure provides a method of enhancing the durability of a titanium dioxide material, comprising: mixing citric acid and an alumina source with an aqueous slurry of titanium dioxide particles and water to form a mixture, the mixture having an acidic pH; and raising the pH of the mixture to a pH of no more than about 7.5 to form alumina-coated titanium dioxide particles.

In certain embodiments, the amount of citric acid in the mixture is at least about 0.1% by weight, based on the weight of the titanium dioxide particles, such as about 0.1% to about 0.5% by weight, based on the weight of the titanium dioxide particles.

In certain embodiments, the amount of the alumina source in the mixture is at least about 0.5% by weight, based on the weight of the titanium dioxide particles, such as about 0.5% to about 3% by weight, based on the weight of the titanium dioxide particles. Example sources of alumina include aluminum sulfate, sodium or potassium aluminate, aluminum chloride, and combinations thereof.

The pH of the mixture before the step of raising the pH is typically less than about 5.5, such as about 1.0 to about 4.0. The pH raising step typically involves raising the pH to about 6.0 to about 7.5.

In another aspect, the present disclosure provides a pigmented plastic article comprising alumina-coated titanium dioxide particles prepared according to the method described herein dispersed in a polymer material.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

Figure 1:
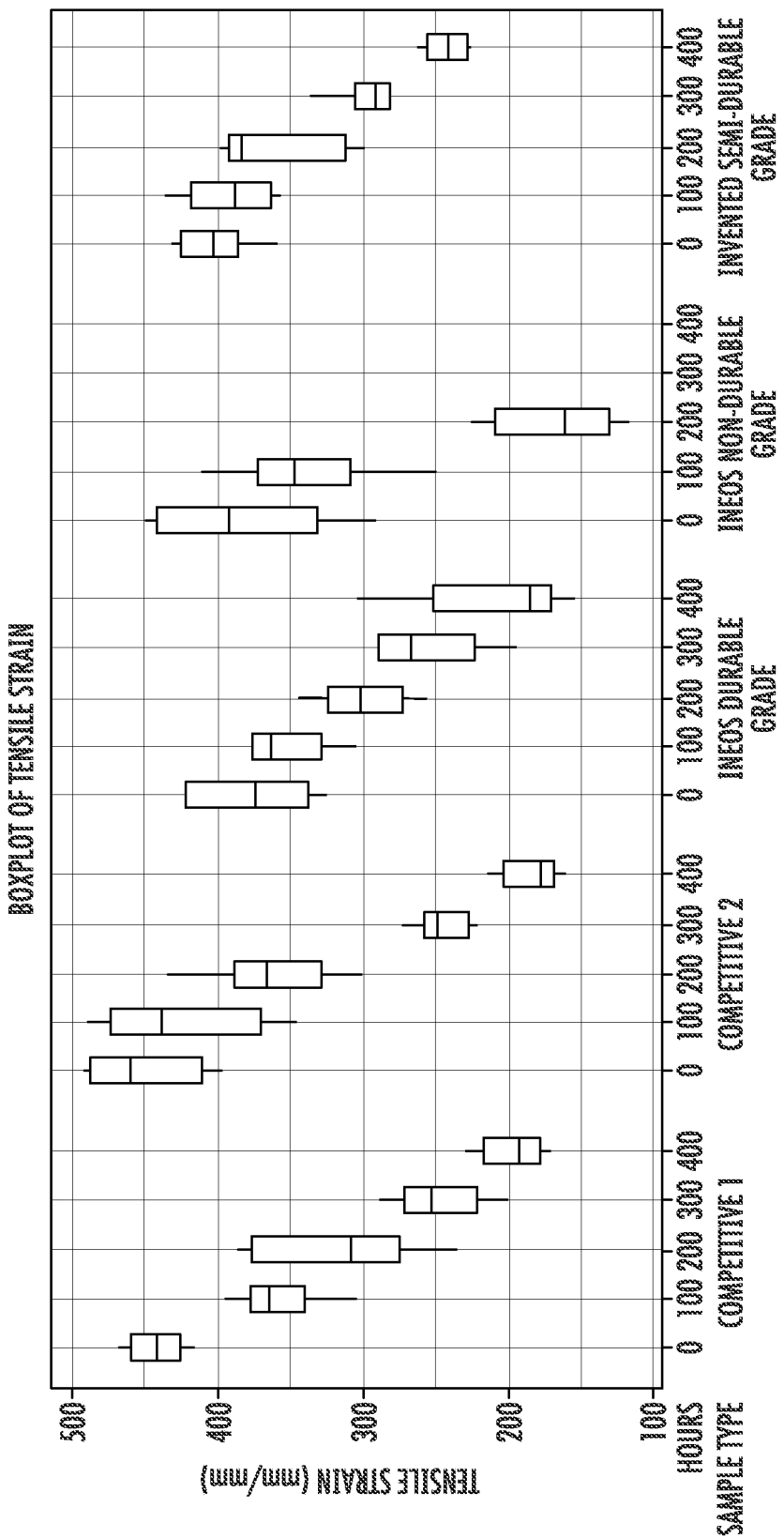
Figure 2:
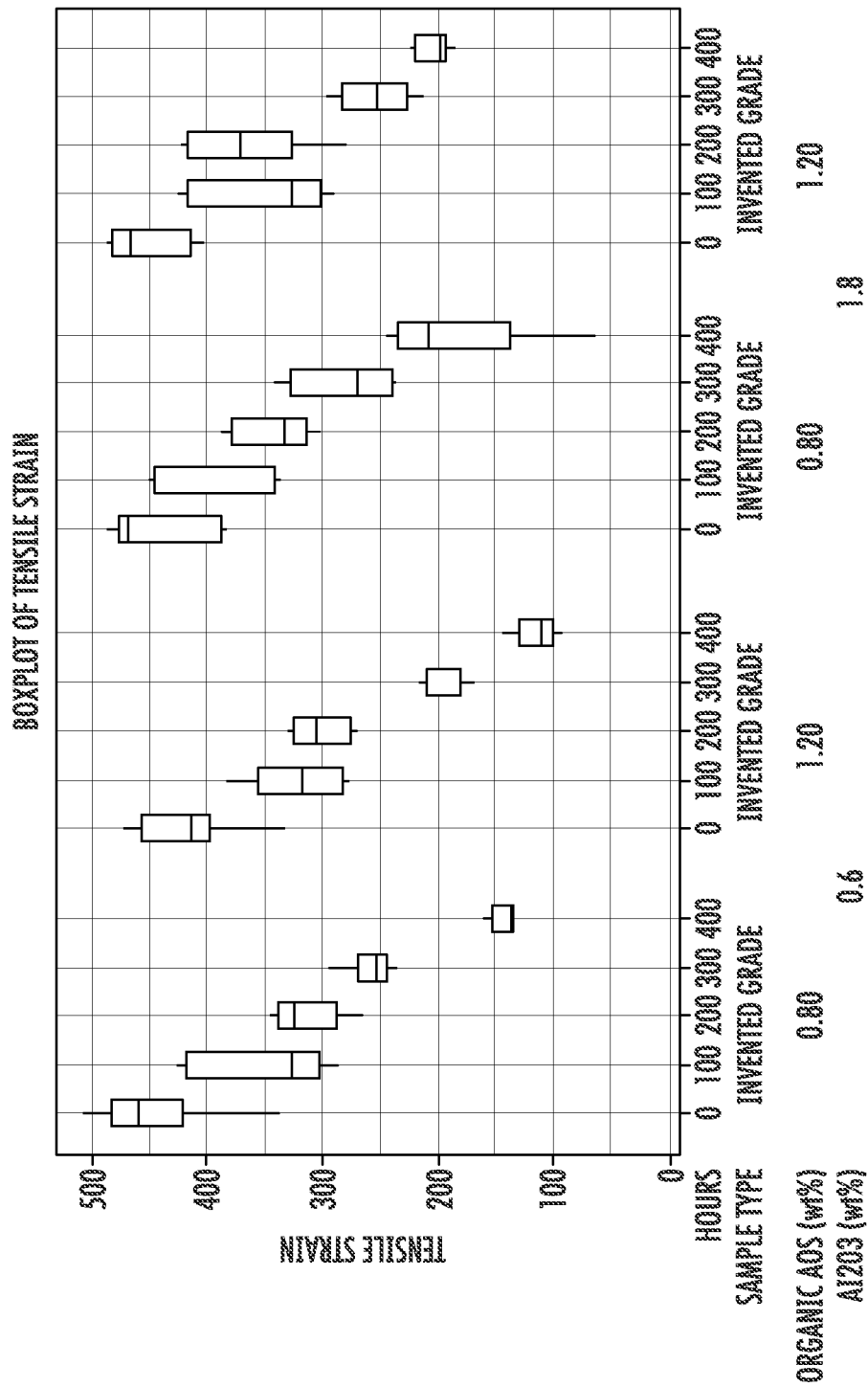
Figure 3:
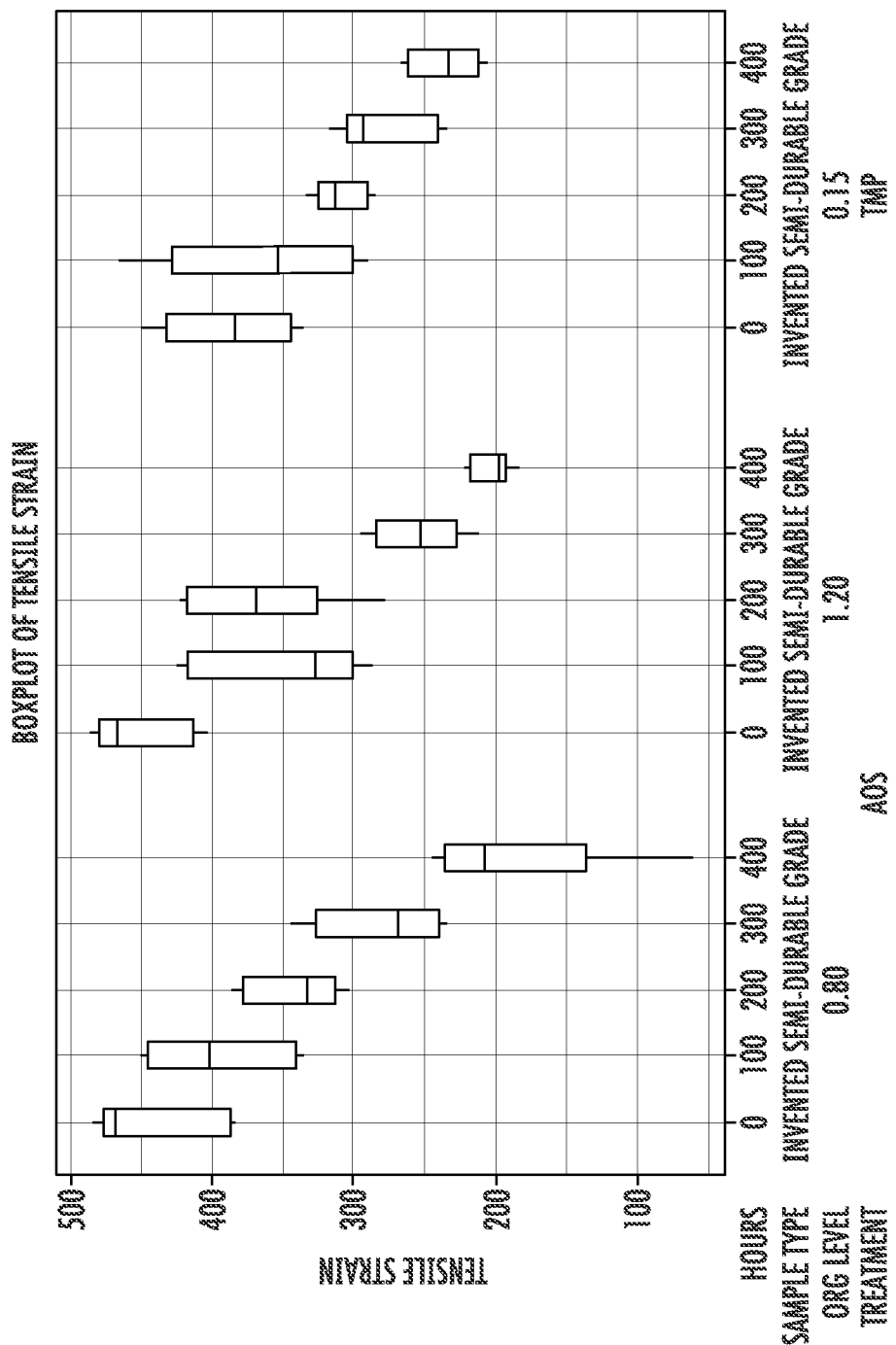

Having thus described the invention in general terms, reference will now be made to the accompanying drawing, wherein:

FIG. 1 graphically illustrates the results of a weathering test of inventive embodiments and comparative materials;

FIG. 2 graphically illustrates the results of a weathering test of inventive embodiments; and FIG. 3 graphically illustrates the results of a weathering test of inventive embodiments.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

I. Titanium Dioxide Precursor Particles

The titanium dioxide ($TiO_2$) precursor particles used in the method of the present disclosure can vary, and in particular, particle size, particle morphology, crystalline polymorph, crystallite size, pore size, and the like can vary in certain embodiments of the disclosure. Titanium dioxide base particles are produced commercially in two crystalline forms, namely the rutile form which is usually produced by the chloride and sulfate processes, and the anatase form which is usually produced by the sulfate process. Both of these processes are generally described in U.S. Pat. No. RE 27,818 and U.S. Pat. No. 2,559,638, which are incorporated herein by reference. The methods described herein could be practiced with both anatase and rutile polymorphs of $TiO_2$.

Although the titanium dioxide may have a rutile or anatase crystalline structure, it can be preferable for the titanium dioxide to be predominately in the rutile form. In this context, "predominately" is intended to mean that greater than 50% by weight of the titanium dioxide particles in the coating composition are in the rutile form. In one or more embodiments, about 75% or greater, about 90% or greater, about 95% or greater, or about 99% or greater (by weight) of the titanium dioxide is in the rutile form. In some embodiments, the titanium dioxide particles can be characterized as being in substantially pure rutile form, meaning that the content of the anatase crystalline form is no greater than about 3%, no greater than about 2%, or no greater than about 1% by weight. The titanium dioxide may be completely free of any titanium dioxide in the anatase form, meaning that the anatase crystal form is not detectable by crystallography. Particle characterization can be carried out using known techniques, such as scanning electron microscopy ("SEM"), transmission electron microscopy (TEM), X-ray diffraction spectroscopy (XRD), or light scattering techniques (such as dynamic light scattering, by Malvern Instruments Ltd., U.K.).

The particle size of the precursor $TiO_2$ particles is not particularly limited in the present invention. In certain embodiments, the precursor $TiO_2$ particles will have an average primary particle size of about 0.1 µm to about 8 µm, about 0.2 µm to about 6 µm, about 0.5 µm to about 5 µm, about 0.6 µm to about 4 µm, about 0.7 µm to about 3 µm, or about 0.8 µm to about 2 µm. Mean size can be determined by, for example, sonication followed by sample testing via laser diffraction particle analyzer, such as a Malvern Mastersizer 2000. The primary particle size of a particle refers to the smallest diameter sphere that will completely enclose the particle. Examples of pigmentary grade titanium dioxide that may be suitable for use in the present disclosure are provided in U.S. Pat. No. 6,342,099, the disclosure of which is incorporated by reference. It is also possible to use mixtures of particles having different average particle sizes within the ranges noted herein (e.g., bimodal particle distributions).

II. Treatment Process

The process of the present disclosure is typically practiced by mixing an aqueous slurry of precursor titanium dioxide particles with citric acid, typically used in solid form or in the form of an aqueous solution, and an alumina source, typically in solid form but possibly in liquid form depending on the type of alumina source. The concentration of $TiO_2$ in the slurry may range from about 50 g/l to about 600 g/l, more typically from about 150 g/l to 450 g/l, although lower and higher levels are also possible.

The amount of citric acid added can vary, but is typically in the range of at least about 0.1% by weight, based on the weight of the titanium dioxide particles, with typical ranges being about 0.1% to about 0.5% by weight (e.g., about 0.15 to about 0.35% by weight). In certain embodiments, the amount of citric acid is characterized as less than about 0.5% by weight, or less than about 0.45% by weight, or less than about 0.4% by weight, or less than about 0.35% by weight, or less than about 0.30% by weight. It is noted that other organic acids could be substituted for citric acid without departing from the invention, such as, for example, other polycarboxylic acids, meaning acids with more than one carboxyl functional group, and particularly polycarboxylic acids with more than one hydroxy functional group. Examples of additional acids include dihydroxymalonic acid, tartaric acid, malic acid, and tartronic acid.

The alumina source may vary, with examples including aluminum sulfate, sodium or potassium aluminate, aluminum chloride, and combinations thereof. The amount of alumina source added can also vary, but is typically in the range of at least about 0.1% by weight, based on the weight of the titanium dioxide particles, with typical ranges being about 0.25% to about 3.0% by weight (e.g., about 0.5 to about 2.5% by weight). In certain embodiments, the amount of alumina source is characterized as less than about 3.0% by weight, or less than about 2.5% by weight, or less than about 2.0% by weight.

The order of addition of citric acid and alumina source can vary, with the citric acid added to the titanium dioxide before, after, or even as a mixture with, the alumina source. In certain embodiments, the citric acid is added first, thoroughly mixed with the titanium dioxide slurry, and the mixture is allowed to age for a period of time, such as at least about 10 minutes, before alumina source addition.

The temperature of the slurry at the time of mixing with the citric acid and alumina source is advantageously room temperature (about 20 to about 25° C.), although slightly elevated temperatures could be used, such as within a range of from about 30 to about 60° C. Higher temperature promotes the alumina crystallinity vs amorphous. This temperature range is typically maintained throughout the process. Lower temperatures are desirable in order to retard crystallization of the alumina.

Once the mixture is prepared, the pH of the mixture is monitored and adjusted as necessary to bring the mixture to an acidic pH. The pH of the aqueous mixture will typically be less than about 5.5, or less than about 5.0, or less than about 4.5, or less than about 4.0, or less than about 3.5, typically within a range of pH of about 1.0 to about 4.0. After all components are mixed, the mixture is typically allowed to age for a period of time, such as at least about 5 minutes or at least about 10 minutes or at least about 15 minutes (e.g., about 5 to about 30 minutes).

Thereafter, the pH of the mixture is raised by slow addition (e.g., dropwise) of a base (typically a strong base such as sodium hydroxide) until a pH of no higher than about 7.5 is reached, typically until a final pH range of about 6 to about 7.5, more typically about 6.5 to about 7.0, is reached. An example length of time for the slow addition of the base is at least about 15 minutes or at least about 30 minutes. After pH adjustment, the mixture is typically allowed to age for a period of time, such as at least about 5 minutes or at least about 10 minutes or at least about 15 minutes (e.g., about 5 to about 30 minutes).

It is desirable for the alumina to be in amorphous form as it is deposited on the titanium dioxide particles. By adding the alumina source to a highly acidic mixture (as noted above), and then slowly raising the pH, the alumina is deposited in the amorphous morphology. If the pH or temperature is allowed to rise too far, undesirable crystallization of the alumina could occur.

Increasing the amount of alumina used in the process may enhance durability, but will also lead to other disadvantageous properties. For example, amorphous alumina is highly water-absorbent, so higher levels of alumina could negatively impact a plastic article to which the treated titanium dioxide particles are added, such as by increasing problems like lacing. Amorphous alumina treatment also tends to reduce flowability of the treated particles, which can create handling problems.

The above process results in alumina-coated titanium dioxide particles, which can be filtered and washed as desired after completion of the above process. The resulting alumina-coated titanium dioxide particles exhibit a surprisingly strong level of durability.

The titanium dioxide particle can also be further surface-treated with one or more compounds known in the art. For example, the titanium dioxide particles can be treated with inorganic phosphates, polyalcohols (e.g., trimethylolethane and trimethylolpropane), alkanolamines (e.g., triethanolamine), organosulfonic compounds (e.g., alpha olefin sulfonate (AOS) compounds such as compounds having the formula $(R-SO_3)_xM^{X+}$ where R represents a saturated, unsaturated, branched, linear or cyclic organic group having from 2 to 22 carbon atoms; X equals 1, 2, 3 or 4; and M represents hydrogen, a metal ion, ammonium ion or organo-ammonium ion such as protonated triethanolamine), or combinations thereof. This surface treatment can occur at any point during the process noted herein, but is typically conducted after treatment with alumina.

Treating titanium dioxide with various materials has been documented in the literature to increase pigment durability. However, many of these known coating techniques require use of silica or a phosphorus-containing material (e.g., phosphoric acid or sodium hexametaphosphate). In the present disclosure, neither silica nor phosphorus materials are necessary. In certain embodiments, both the method of the disclosure and the alumina-coated titanium dioxide particles of the disclosure can be characterized as substantially or completely free of one or both of silica and phosphorus. "Substantially free" means "little or no" or "no intentionally added" and also having only trace and/or inadvertent amounts. For instance, in certain embodiments, "substantially free" means less than 1.0 wt %, less than 0.5 wt %, less than 0.25 wt % or less than 0.01 wt %, based on the weight of the alumina-coated titanium dioxide particles.

III. Example Uses

The alumina-coated titanium dioxide particles made according to the present disclosure are particularly well-suited for use as a pigment in plastic articles, such as those falling within categories of semi-durable goods. Example plastic articles include plastic sheeting and films (e.g., agricultural films and sheeting, food packaging films, and the like) and nonwoven textiles. Example polymer materials used in such articles can include thermoplastic resins such as acrylonitrile butadiene styrene (ABS), polyolefins such as polyethylene and polypropylene, polycarbonates, polyamides, polystyrene, polyvinyl chloride (PVC), and the like.

However, the particles also may be used with advantage in various other applications, such as surface coatings for various articles, including those made of wood or plastic (including automotive parts), sunscreens and cosmetic formulations, catalyst products, photovoltaic cells, rubber based products, and glass products.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1

A blue tone titanium dioxide slurry was adjusted to 400 g/l and stirred at room temperature. Solid citric acid was added in an amount sufficient to achieve 0.3% by weight citric acid based on the weight of $TiO_2$ and the slurry was allowed to age for 10 minutes. Solid aluminum sulfate hexadecahydrate (97% active) was added over a 10-minute period in an amount sufficient to achieve 1.8% by weight alumina based on the weight of the $TiO_2$. The mixture was allowed to age for another 30 minutes. The pH was checked and adjusted as needed to achieve a pH of 2.9. Concentrated sodium hydroxide (50% weight active) was added dropwise with mixing over a period of at least 30 minutes until a pH of 6.0 was reached. The mixture was then aged for 10 minutes. Dropwise addition of sodium hydroxide was resumed until a pH of 7.5 was reached. The mixture was then aged for 10 minutes and the pH was checked and adjusted as necessary to maintain a pH of 7.5. The slurry was aged for another ~10 min and then filtered and washed. The sample was dried in an oven at 110° C. overnight. The dried sample was than treated with an organic, trimethylolpropane (TMP), at 0.15% TMP (calculated based on the weight of $TiO_2$). Size reduction was achieved on a micronizer (fluid energy mill).

Example 2: Weathering Testing

A weathering test was conducted, which compared treated $TiO_2$ particles prepared according to the invention to various other $TiO_2$ particle materials. Specifically, an inventive material prepared according to Example 1 above (i.e., prepared with 0.3% citric acid with 1.8% alumina) was compared to two lots of a commercially available semi-durable titanium dioxide product (hereinafter called Competitive 1 and Competitive 2), as well as a high performance, low durability RCL188 titanium dioxide product available from INEOS Pigments, and a high durability RCL696 titanium dioxide product available from INEOS Pigments. The sample preparation and weathering test protocol are described below.

White LDPE Concentrate—20 wt % $TiO_2$ Pigment:

For each titanium dioxide material, a dry mix of 43.9 g $TiO_2$ in 175.5 g 8.0 MI LDPE resin was hand mixed then compounded on the Haake PolyLabOS Torque Rheometer with RheoMix 3000 chamber and Banbury Mixing blades. The RheoMix 3000 chamber was pre-heated to 75° C. and a rotor-speed set point of 50 RPM. The chamber was closed and the mixture was processed for 1.0 minutes before the chamber-temperature set point was increased to 105° C. The mixing torque was observed for its peak and the sample was processed for an additional 3.0 minutes beyond the peak. The concentrate melt was removed from the mixing chamber and immediately pelletized with a Conair Granulator.

Letdown to 14 wt % $TiO_2$ Pigment:

The pelletized concentrate was combined with virgin 8.0 MI LDPE and tumble-mixed by hand to achieve an average of 14 wt % $TiO_2$ pigment. The added mass of virgin 8.0 MI LDPE was calculated using the formula below.

$$\text{Mass of Concentrate} * \left(\frac{0.20}{0.14} - 1\right) = \text{Mass of Virgin 8.0 MI } LDPE$$

Film Manufacture:

The 14 wt % Let Down was processed through a 24:1 (L:D) Killion 1-inch extruder fitted with 8 in coat-hanger film die. The melt was cast into film using a chrome, 10-inch water-cooled roll system and fed through a chrome, water-cooled 4-inch nip roll to produce a 10-inch wide, 2-mil-thick white film. The extruder and cast-film take-off system were operated under the following conditions:

Screw Speed (RPM): 90.0

Temperature (Zone1, Zone2, Zone3, Clamp, Die; ° C.): 165.5, 176.7, 193.3, 212.8, 232.2

Take-Off motor Speed (RPM): 42.3

Chill-Roll Temp Range (Outlet, ° C.): 18.9-21.2

Films were stored in a dark environmental chamber at 23° C. and 50% Relative Humidity.

Film Exposure (QUV):

Films were mounted and exposed in Q-Lab QUV/SE in accordance with ASTM G151, and G154 until failure. A failure in this test is defined as any break through both surfaces of the film.

Film Preparation:

Bulk films were cut into 1-inch-by-10-inch specimens (ten specimens for each time-test interval in addition to a baseline set) with a dual-blade shear cutter as specified by ASTM D6287. Films were stored in a dark environmental chamber at 23° C. and 50% Relative Humidity before and after preparation.

Specimen Characterization:

Each specimen was measured for thickness at four places along its length to account for thickness variations using a Mitutoyo 7326S film thickness gauge. Specimens were evaluated for L*, a*, and b* using the Datacolor 600 Spectrophotometer. Tensile testing was carried out in accordance with ASTM D882 on an Instron 4465 fitted with pneumatic rubber thin-film grips.

Weather-O-Meter Exposure:

Specimens were mounted vertically with each end draped over the Weather-O-Meter's (WOM) mounting frame and fixed in place with a plastic clip. WOM exposure was carried out in accordance with ASTM G155.

The results of the test are set forth in FIG. 1. In the figure, for each sample, data is provided at each time point (from left to right, 0 hours, 100 hours, 200 hours, 300 hours, and 400 hours), with error bars indicated for reach data point. As shown, the inventive semi-durable example provided competitive weathering results per the WOM test, outperforming the Competitive 1 and Competitive 2 materials, and providing similar performance or slight improvement as compared to the high durability RCL696 INEOS Pigment product.

Example 3: Organic Treatment Comparison

Following the same basic process of Example 1, samples were prepared with organic treatment using alpha olefin sulfonate (AOS) rather than TMP. See, for example, the AOS compounds and methods of treatment utilizing AOS compounds set forth in U.S. Pat. No. 6,646,037, which is incorporated by reference herein. The samples were prepared at two different AOS inclusion levels (0.80% and 1.2%, calculated based on the weight of $TiO_2$) and two different alumina levels (0.6% and 1.8% calculated based on the weight of $TiO_2$).

The weathering test of Example 2 was repeated on all AOS samples and the results are set forth in FIG. 2. As shown, the use of AOS provided comparable performance to the TMP sample of Example 1 shown in FIG. 1.

As a further comparison, another sample was prepared according to Example 1 and subjected to the weathering test of Example 2. FIG. 3 provides side-by-side results of the 1.8% alumina AOS samples and the 1.8% alumina TMP sample prepared as described in Example 1. As shown, the weathering performance was very similar for all samples.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of enhancing the durability of a titanium dioxide material, comprising:
   a) mixing citric acid and an alumina source with an aqueous slurry of titanium dioxide particles and water to form a mixture, the mixture having an acidic pH of less than 5.5; and
   b) raising the pH of the mixture to a pH of no more than about 7.5 to form alumina-coated titanium dioxide particles,
   wherein the method is substantially free of use of silica materials and phosphorus materials; and
   wherein the alumina-coated titanium dioxide particles comprise alumina in amorphous form.

2. The method of claim 1, wherein the amount of citric acid in the mixture is at least about 0.1% by weight, based on the weight of the titanium dioxide particles.

3. The method of claim 2, wherein the amount of citric acid in the mixture is about 0.1% to about 0.5% by weight, based on the weight of the titanium dioxide particles.

4. The method of claim 1, wherein the amount of the alumina source in the mixture is at least about 0.5% by weight, based on the weight of the titanium dioxide particles.

5. The method of claim 4, wherein the amount of the alumina source in the mixture is about 0.5% to about 3% by weight, based on the weight of the titanium dioxide particles.

6. The method of claim 1, wherein the alumina source is selected from the group consisting of aluminum sulfate, sodium aluminate, potassium aluminate, aluminum chloride, and combinations thereof.

7. The method of claim 1, wherein the acidic pH of the mixture is about 1.0 to about 4.0.

8. The method of claim 1, wherein raising the pH of the mixture comprises raising the pH to a pH of about 6.0 to about 7.5.

9. The method of claim 1, further comprising treating the titanium dioxide particles with one or more surface treatments selected from polyalcohols, alkanolamines, organosulfonic compounds, or combinations thereof.

10. A pigmented plastic article comprising alumina-coated titanium dioxide particles prepared according to the method of claim 1 dispersed in a polymer material.

11. The method of claim 1, wherein the acidic pH is less than 5.0.

12. The method of claim 1, wherein the acidic pH is less than 4.5.

13. The method of claim 1, wherein the acidic pH is less than 4.0.

14. The method of claim 1, wherein the acidic pH is less than 3.5.

15. The method of claim 1, wherein the acidic pH is from 1.0 to 4.0.

16. The method of claim 1, wherein the acidic pH is about 2.9.

17. The method of claim 1, wherein the mixture consists essentially of citric acid, the alumina source, the titanium dioxide particles, and the water.

* * * * *